United States Patent
Gluskin et al.

(10) Patent No.: US 11,037,713 B2
(45) Date of Patent: Jun. 15, 2021

(54) HELICAL SUPERCONDUCTING UNDULATOR FOR 3RD AND 4TH GENERATION OF SYNCHROTRON LIGHT SOURCE AND FELS

(71) Applicant: UCHICAGO ARGONNE, LLC, Chicago, IL (US)

(72) Inventors: Efim Gluskin, Darien, IL (US); Matthew Kasa, New Lenox, IL (US); Yury Ivanyushenkov, Darien, IL (US); Joel D. Fuerst, Glen Ellyn, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 240 days.

(21) Appl. No.: 16/404,934

(22) Filed: May 7, 2019

(65) Prior Publication Data
US 2020/0357550 A1  Nov. 12, 2020

(51) Int. Cl.
| | | |
|---|---|---|
| H01F 6/06 | (2006.01) |
| H01S 3/09 | (2006.01) |
| H05H 13/04 | (2006.01) |
| H01F 6/04 | (2006.01) |

(52) U.S. Cl.
CPC .......... *H01F 6/06* (2013.01); *H01F 6/04* (2013.01); *H01S 3/0903* (2013.01); *H05H 13/04* (2013.01)

(58) Field of Classification Search
CPC .......... H01F 6/06; H01F 6/04; H01S 3/0903; H05H 13/04; H05H 2007/041; H05H 7/04
See application file for complete search history.

(56) References Cited

U.S. PATENT DOCUMENTS

| | | | | |
|---|---|---|---|---|
| 4,523,168 A * | 6/1985 | Emanuelson | ......... | H01S 3/0903 335/296 |
| 5,079,458 A * | 1/1992 | Schuster | ......... | F16H 25/24 310/12.26 |
| 6,223,419 B1 * | 5/2001 | Abramov | ......... | H05K 3/3442 29/602.1 |
| 6,921,042 B1 * | 7/2005 | Goodzeit | ......... | H02K 55/00 242/430 |

(Continued)

OTHER PUBLICATIONS

Alferov et al., "Generation of circularly polarized electro-magnetic radiation," Soviet Physics, Technical Physics, vol. 21, No. 11, pp. 1408-1411, 1976.

(Continued)

*Primary Examiner* — Mohamad A Musleh
(74) *Attorney, Agent, or Firm* — Marshall, Gerstein & Borun LLP

(57) ABSTRACT

A helical superconducting undulator includes a cylindrical magnetic core through which a bore hole allows the passage of charged particles. A single superconducting wire wraps the magnetic core guided by helical flights and cylindrical protrusions, to create interleaved helical windings on the magnetic core. An electrical current may be supplied to the superconducting wire to generate a periodic helical magnetic field in the bore. The helical superconducting undulator also includes a strong-back enclosure that acts as an epoxy mold during epoxy impregnation, a structural support to ensure straightness of the undulator after epoxy impregnation, and assists in cooling and thermal control of the magnetic core and superconducting wire during device operation.

12 Claims, 9 Drawing Sheets

(56) References Cited

U.S. PATENT DOCUMENTS 7,798,441 B2 * 9/2010 Stelzer .................. H01F 41/086
242/430
10,062,486 B1 8/2018 Gluskin et al.

OTHER PUBLICATIONS

Elias et al., "Superconducting helically wound magnet for the free-electron laser," Rev. Sci. Instrum. 50 (1979) 1335.

Fajans et al., "End effects of a bifilar magnetic wiggler," Jour. of App. Phys., vol. 55, p. 43, 1984.

Kezerashvili et al., "Colliding beam polarization measurement using superconducting helical undulator at the VEPP-2M storage ring," Nucl. Instr. Meth. A, vol. 314, No. 1, pp. 15-20, 1991.

Ivanyushenkov et al., "Development of a Superconducting Helical Undulator for a Polarized Positron Source," in Proc. PAC'05, Knoxville, TN, USA, 2005, paper THPMN071, p. 2295.

Mikhailichenko et al., "Test of SC Undulator for ILC", in Proc. EPAC'06, Edinburgh, Scotland, 2006, paper MOPLS107, p. 813.

Kim et al., "Development of a MODEL superconducting helical undulator for the ILC positron source", in Proc. PAC'07, Albuquerque, NM, USA, Jun. 2007, paper TUPMN094, p. 1136.

Vogt, "Recent Development and Future Plans at the Advanced Photon Source," Argonne National Laboratory, Jun. 2018.

Ivenyushenkov, Yuri, Superconducting Undulators—from an idea to real devices, presentation ASD Seminar, Mar. 18, 2013.

Ivanyushenkov et al., "Status of the Development of Superconducting Undulators at the Advanced Photon Source," *Proceedings of IPAC* (2017).

Kasa et al., "Design, Constructions, and Magnetic Field Measuremenets of a Helical Superconducting Undulator for the Advanced Photon Source," *9th International Particle Accelerator Conference*, (2018).

Bettenhausen et al., "Superconducting Undulators at ANL," presentation at the *Advanced Low Emitting Rings Technology Workshop*, (2016).

Gluskin et al., "A Superconducting Helical Undulator-based FEL Prototype Cryomodule," (2016).

Chavanne, J. "Physics of Undulators," presentation, European Synchrotron Radiation Facility.

* cited by examiner

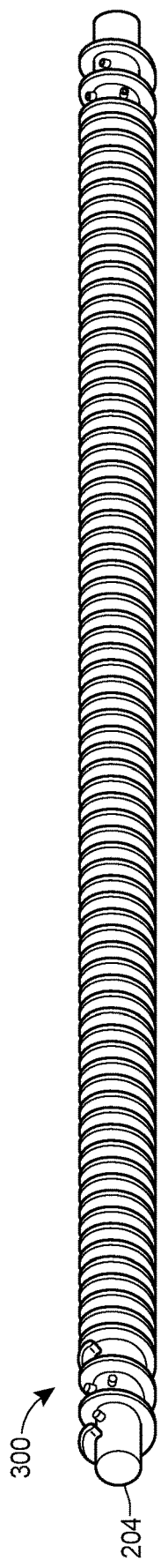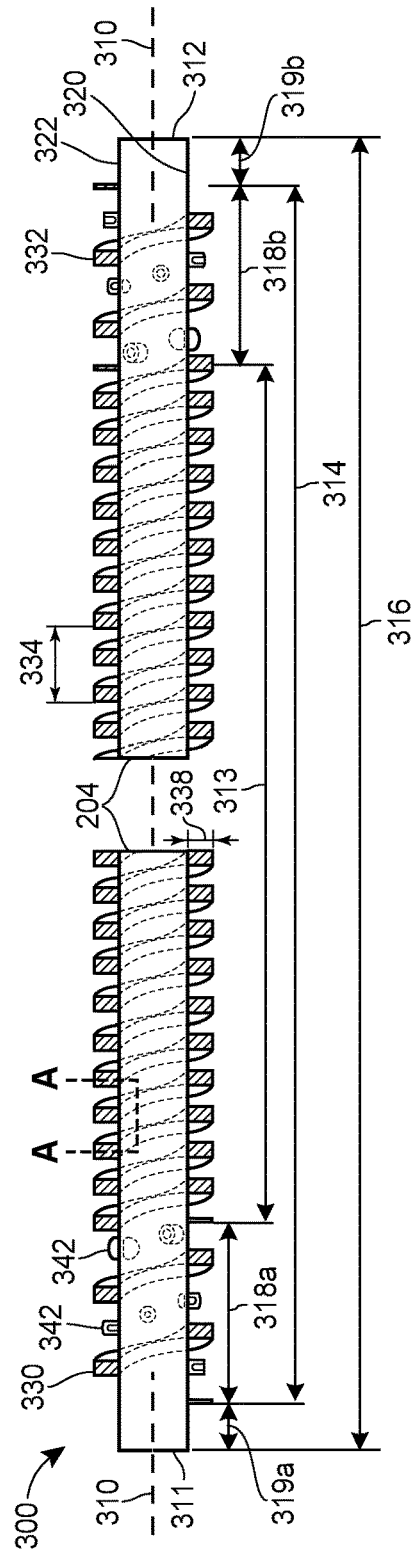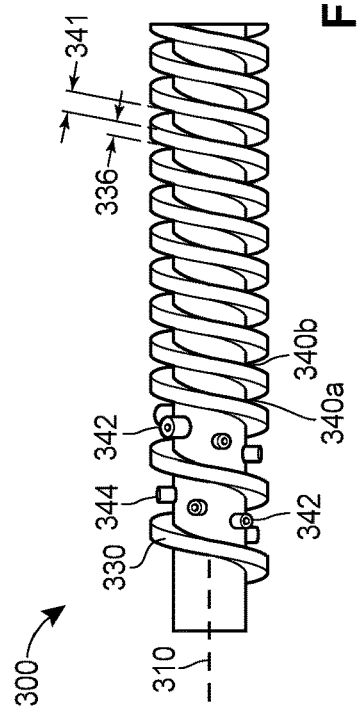
FIG. 3A
FIG. 3B
FIG. 3C

HELICAL SUPERCONDUCTING UNDULATOR FOR 3RD AND 4TH GENERATION OF SYNCHROTRON LIGHT SOURCE AND FELS

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to high-energy physics and, in particular, to superconducting undulator technologies for use in particle accelerators and, more specifically, for use in synchrotrons and free-electron laser light sources.

BACKGROUND

In contemporary high brightness synchrotron and free electron laser (FEL) radiation sources, undulators serve as the primary source of radiation. Undulators provide high brightness radiation beams with narrow spectral peaks, reducing unnecessary or unwanted spectral content and increasing the efficiency of the device for multiple applications. Undulators, as parts of storage ring-based synchrotron light sources or FELs, can be configured to generate radiation across a broad range of frequencies or energies, for example x-ray radiation with wavelengths near 0.1 nanometers, or radiation in the far-infrared range from 400 to 1000 microns. Another feature of undulator radiation is its high collimation and, as a result, the ability to focus x-ray beams to very small probes. The potential for single spectral mode operation of undulators, along with the ability to create devices operating at a broad range of energies, makes undulator technologies highly attractive for a multitude of unique experiments and technological applications.

An undulator is a magnetic device used in high-energy physics that consists of a periodic arrangement of magnets or magnetic fields. FIG. 1 illustrates a typical embodiment of an undulator device 100. An electron 102 with an initial injection path 104 is injected into the undulator device 100 with a first row of magnets 106a-j and a second row of magnets 107a-j that is apart from and opposes the first row of magnets 106a-j. The two rows of magnets 106a-j and 107a-j induce magnetic fields between them. The first set of magnets 106a and 107a with upward pointing arrows denote magnets configured to create a magnetic field with field lines coming out of the page, or the plane of electron motion, represented by the dots between the first set of magnets 106a and 107a, while magnets with downward pointing arrows, such as the second set of magnets 106b and 107b in each row, denote magnets configured to create a magnetic field with field lines going into the page, or the plane of electron motion, represented by the x's between the second set of magnets 106b and 107b. Although the magnetic field line dots and x's are only shown between the first two sets of magnets 106a and 107a, and 106b and 107b, magnetic fields exist between each set of magnets in FIG. 1 with fields going into or out of the page corresponding to the respective down and up arrows on the magnets.

As the electron 102 moves into the first magnetic field between the first set of magnets 106a and 107a, the magnetic field induces a change in the direction of the trajectory of the electron 102 causing the electron 102 to move in an upward direction in the plane of the page. Once the electron 102 has moved out of the first magnetic field between the first set of magnets 106a and 107a into the second magnetic field between the second set of magnets 106b and 107b the magnetic field is reversed, or in an opposite direction, to the first magnetic field between the first set of magnets 106a and 107a. Therefore, the second magnetic field between the second set of magnets 106b and 107b causes the trajectory of the electron 102 to accelerate in a direction opposite to that of the induced trajectory change due to the first magnetic field between magnets 106a and 107a. As the electron 102 travels from one magnetic field to the next through the undulator device 100, the periodic reversing or switching of the magnetic field direction causes the trajectory of the electron 102 to oscillate or undulate as illustrated by the oscillatory trajectory 110 shown in FIG. 1. By changing the direction or the trajectory of the electron 102, the periodic magnetic field accelerates the electron in an oscillatory pattern. As a result, the electron 102 emits electromagnetic radiation 112 defined by the electron's oscillatory trajectory. The wavelength, polarization, and intensity of the emitted electromagnetic radiation 112 depend on the strength of the magnets, the period of the magnetic field oscillation, the length of the undulator, and the direction and pattern of the periodic magnetic fields, among other factors. In fact, characteristics of the emitted electromagnetic radiation may be tunable, for example the wavelength of the emitted electromagnetic radiation may be tuned by controlling the energy of the electron, or by adjusting the magnetic-field strength of the magnets.

The electron 102 may be one of multiple electrons in an electron beam. The intensity of the emitted electromagnetic radiation 112 is linearly dependent on the number of electrons in an electron beam passing through the undulator device 100. For major parts of the spectrum, the radiation emitted from different electrons 102 in an electron beam passing through the undulator device 100 is incoherent due to random locations of the electrons 102 in space and time. Under special conditions, applied to the electron beam, and with a long enough undulator, the interaction of the emitted electromagnetic radiation 112 with the electrons 102 in the electron beam could cause the electrons 102 to clump into microbunches, each microbunch separated from adjacent microbunches by one wavelength of the emitted electromagnetic radiation 112. The microbunches, each positioned one wavelength from an adjacent microbunch, oscillate in phase with each other. As the intensity of the emitted electromagnetic radiation 112 increases further, the electrons are further clumped into microbunches with higher concentrations of electrons 102. The microbunches of electrons oscillating in phase with each other emit electromagnetic radiation 112 that is in phase, and allows for an overall increase, by many orders of magnitude, in the intensity of the emitted electromagnetic radiation 112.

The future performance of FELs and storage ring radiation sources depends greatly on the next generation of undulators with increased magnetic fields. Such superior undulator magnetic fields can be achieved with superconducting technology. Increasing the length of the undulator superconducting magnet can increase the total intensity of emitted radiation. Although, increasing the undulator length may contribute to other technical issues and considerations such as complicating magnet alignment and structural straightness, necessitating more stringent mechanical requirements, complicating coherence issues and tolerances, requiring more complex cryogenic cooling modules with greater cooling capacity, integrated electron beam focusing, and structural issues due to very strict straightness requirements. In addition, while permanent magnet undulators may be simpler to manufacture, radiation exposure from the charged particle beams that they accelerate can cause demagnetization.

SUMMARY OF THE DISCLOSURE

A superconducting undulator device having a cylindrical magnet core, the core having (i) a magnetic length, (ii) a winding length extending beyond the magnetic length, (iii) an overall length extending beyond the winding length at each end by an end length, (iv) a first turn-around length defined as the portion of the winding length toward the first end extending beyond the magnetic length, and (v) a second turn-around length defined as the portion of the winding length toward the second end extending beyond the magnetic length. The midpoints of each of the magnetic length, the winding length, and the overall length are co-located. The core further including (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core. Each of the helical flights have a same pole width, a same height and a top helical surface with a radius of curvature relative to the longitudinal axis of the magnet core, a total diameter equal to twice the radius of curvature of the top helical surfaces. The two helical flights cooperate to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core.

The superconducting undulator device further includes a plurality of cylindrical protrusions in each turn-around length of the undulator device, each cylindrical protrusion having a longitudinal axis orthogonal to the longitudinal axis of the core, and having a height, relative to the outer surface of the core, equal to the height of the helical flights. The protrusions further include a top surface at the height of the helical flights with a radius of curvature equal to the radius of curvature of the top surface of the helical flights. The longitudinal axis of the cylindrical protrusions in the first turn-around length toward the first end are centered between consecutive turns of the first helical flight and may be positioned a quarter of a helical period from the longitudinal axis of any other cylindrical protrusion in the first turn-around length toward the first end of the magnet core. Similarly, the longitudinal axis of each of the cylindrical protrusions in the second turn-around length toward the second end are centered between consecutive turns of the second helical flight and may be positioned a quarter of a helical period from the longitudinal axis of any other cylindrical protrusion in the second turn-around length toward the second end of the magnet core. A plurality of detachable cylindrical extensions, each having a longitudinal axis orthogonal to the longitudinal axis of the core and coaxial with the longitudinal axis of the corresponding cylindrical protrusion, may be coupled to the top surfaces of the cylindrical protrusions.

A superconducting wire wraps around the core disposed within the helical groove, the wire forming a multilayer coil configured to receive and carry a current and to cooperate with the core to generate magnetic fields for guiding the charged particle beam. The superconducting wire may be wrapped around the core in layers numbered beginning with the layer closest to the outer surface of the magnet core. The layers may have an even number of coil windings on odd numbered coil layers, and an odd number of coil windings on even numbered coil layers.

The superconducting undulator device may further include a strong-back enclosure that houses the cylindrical magnetic core, cylindrical protrusions, and superconducting wire. The strong-back enclosure having two panels each with a concave opening with a diameter equal to the total diameter of the magnet core. The strong-back enclosure further includes epoxy injection ports extending from an outer surface of the panels and in fluid communication with the concave opening. A coolant channel extends longitudinally along the length of the strong-back enclosure not in fluid communication with the concave opening, and a coolant port provides fluid communication between an exterior surface of the strong-back panels and the coolant channel.

BRIEF DESCRIPTION OF THE DRAWINGS

FIG. 3A illustrates an embodiment of a helical magnet core with cylindrical protrusions.

FIG. 3B is a mechanical schematic cutaway view of the helical magnet core of FIG. 3A.

FIG. 3C is a mechanical schematic of the helical magnet core of FIG. 3A.

DETAILED DESCRIPTION

Figure 1:
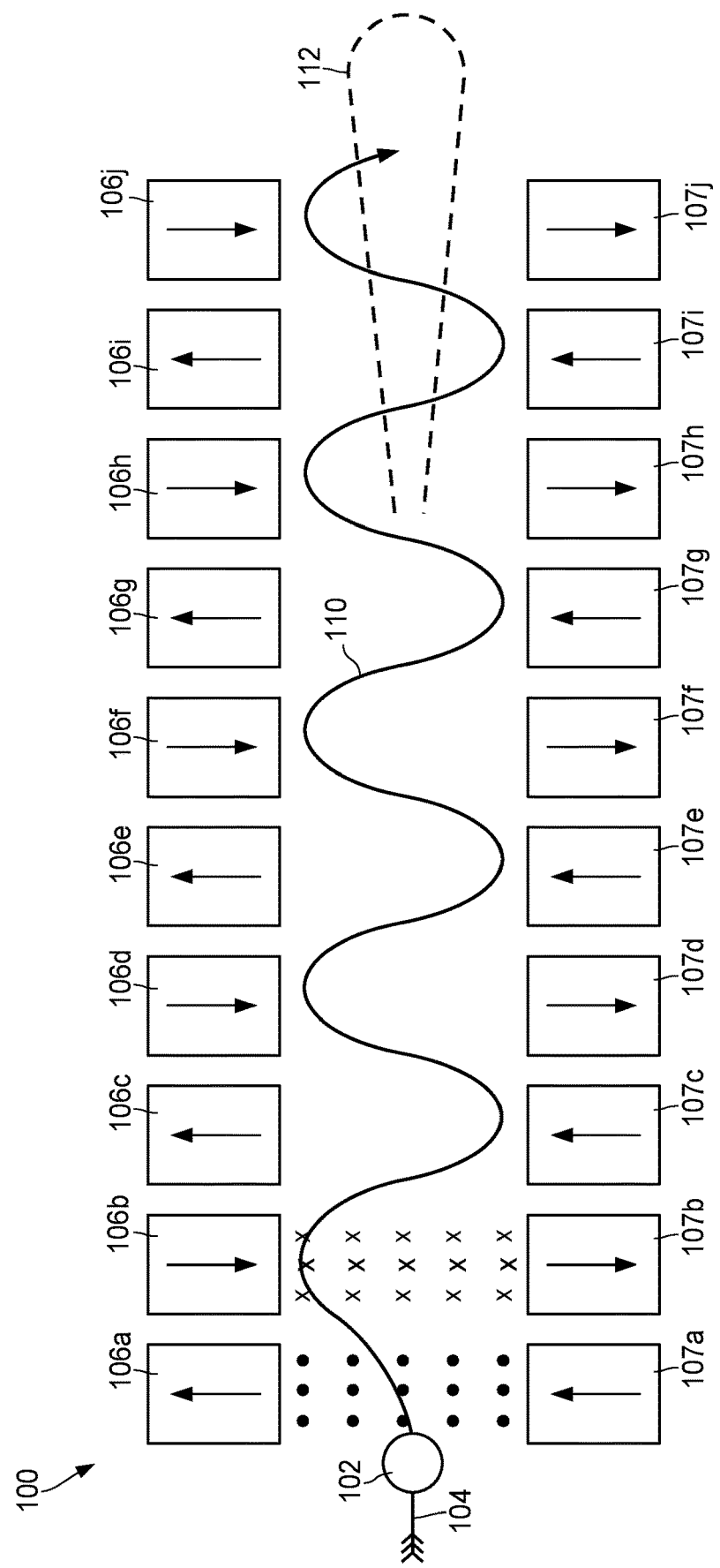
FIG. 1 illustrates a typical embodiment of an undulator configuration and an electron trajectory through the undulator.

Superconducting magnet-based undulators outperform undulators built with permanent magnets or room-temperature electromagnets in terms of peak magnetic field and, therefore, in the energy range of emitted radiation. Superconducting technology advances the utilization of undulators in the development and construction of novel high power radiation sources. The superconducting undulator (SCU) in accordance with the present description features a double-helix superconducting magnetic structure with unique features to satisfy tight mechanical and magnetic tolerances. The superconducting helical undulators described herein may be useful for a $3^{rd}$ or $4^{th}$ generation synchrotron light source, or as a FEL.

It is imperative for an undulator installed as an operational light source, in a storage ring or FEL, to have a net zero effect on the electron beam characteristics, and the quality of radiation emitted by other undulators. To achieve a net zero effect on the trajectory of the electron beam, the first and second integrals of the overall undulator magnetic field must equal zero. It is challenging to zero the first and second integrals of the magnetic field near the ends of an undulator, where precise control of tapering the magnetic field to zero is required. Such a tapering has never been accomplished before for axially symmetrical helical superconducting undulators (HSCUs) compatible with the requirements of $3^{rd}$ and $4^{th}$ generation synchrotron light sources. In addition to the tapering of the magnetic field, high-multipole magnetic moments that affect the quality of the electron beam have to be controlled within specified limits.

Typically, independent permanent magnets, electromagnets, or superconducting magnets of different magnetic field strengths are implemented to achieve the tapering up or tapering down of the magnetic field at ends of an undulator device. Using multiple independent magnets to taper up or taper down the magnetic field can introduce magnetic field errors near the ends of the undulator device due to physical fabrication errors of the independent magnets, placement and position errors of the magnets, and/or electrical current errors due to independent currents in the case of electromagnetic and superconducting magnets. Helical devices have a magnetic field throughout the device with a rotating field vector, instead of periodically going to zero as is typical in planar undulator devices, therefore providing a higher average magnetic field compared with a planar undulator of the same absolute peak magnetic field. Significant savings in cost and construction can be gained by using helical undulators as radiation sources in storage rings and FELs. In embodiments described herein, a single superconducting wire is implemented and a single current may be passed through that wire to generate the required tapered, symmetric magnetic field profiles for undulator devices. The disclosed embodiments implement a series of turn-around pins near the ends of a magnet core that redirect the single superconducting wire back and forth along the length of the magnet core to generate the desired magnetic field profiles.

Figure 2:
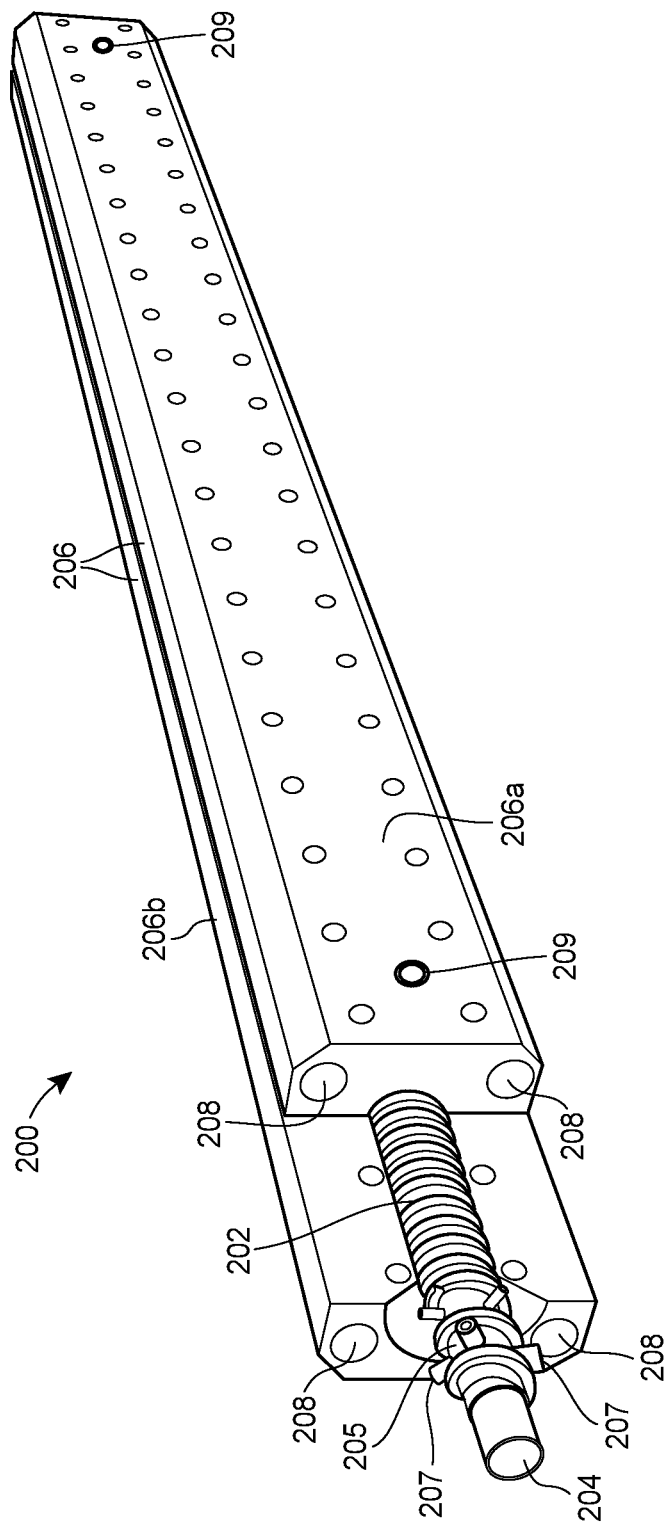
FIG. 2 is a perspective cut-away view of an embodiment of an undulator device having a superconducting helical magnetic core and a strong-back enclosure.

FIG. 2 is a perspective cut-away view of an embodiment of a helical superconducting undulator 200 having a helical magnetic core 202 and a strong-back enclosure 206 made of a first strong-back panel 206a and a second strong-back panel 206b. The magnetic core 202 has a bore hole 204 acting as a central channel for a charged particle beam to pass through. The magnetic core 202 also has a series of turn-around pins 207 on each end of the magnetic core 202 in a turn-around region or turn-around length 205 of the magnetic core 202, which will be further discussed in more detail with reference to FIGS. 3B and 3C. The strong-back enclosure 206 also has cooling channels 208 along the length of each of the first and second strong-back panels 206a and 206b to provide a region to contain a coolant, or a path for a coolant (e.g., liquid helium) to flow through. While the strong-back enclosure 206 provides a means for indirect cooling of the superconducting magnet core 202, it also acts as a mold for epoxy impregnation. Epoxy injection ports 209 extend from an outer surface of the strong-back panels 206a and 206b and provide fluid communication between the outer surface of the strong-back panel and the region between the strong-back panels 206a and 206b where the magnet core 202 is contained. The epoxy injection ports 209 provide a channel for injecting epoxy during epoxy impregnation.

Typically, a superconducting magnet core is removed from any molding after epoxy impregnation due to space constraints in cryostats as well as to reduce the magnetic gap, particularly in planar undulators. In embodiments disclosed herein, the superconducting magnet core 202 is not removed from the epoxy mold, i.e., the strong-back enclosure 206, after epoxy impregnation. As will be further discussed, tight superconducting wire coil windings and a uniform total diameter magnetic core 202 allow for tighter machine tolerances for the epoxy mold, which, for the superconducting device 200, also serves as the strong-back enclosure 206. Due to the length of the superconducting magnet core 202, the strong-back enclosure 206 contains the magnetic core 202 after epoxy impregnation, and provides mechanical and structural support to the magnetic core 202 to ensure a required high level of straightness of the magnetic core 202. In addition, the strong-back enclosure 206 provides a means for induced cooling of the magnet core 202.

FIG. 3A is a perspective view of an embodiment of a helical superconducting magnet core 300. FIG. 3B is a mechanical schematic cutaway view of the helical magnet core of FIG. 3A, while FIG. 3C is a mechanical schematic of the helical magnet core of FIG. 3A. Referring now to FIGS. 3B and 3C simultaneously, the magnet core 300 has two edges that define a first end 311, and second end 312 of the magnet core 300. An inner surface 320 of the magnet core 300 defines a hollow cylindrical bore hole 204 or channel along the overall length 316 of the magnet core 300 from the first end 311 to the second end 312 of the magnet core 300. The bore hole 204 or channel is configured to allow charged particles to enter the magnet core 300 at the first end 311, travel through the magnet core 300 along its overall length 316, and exit the magnet core 300 at the second end 312. A cylindrical outer surface 322 of the magnet core 300 is concentric with the inner surface 320 with a radius greater than the radius of the inner surface 320, defining a thickness of the cylindrical, non-helical component of the magnet core 300. The outer surface 322 is also the surface on which a superconducting wire may be wrapped (discussed further in reference to FIG. 4A), therefore the outer surface 322 is also referred to as the winding surface.

The magnet core 300 of FIGS. 3B and 3C may be described as having a magnetic length 313, a winding length 314 that extends beyond the magnet length 313, an overall length 316 that extends beyond the winding length 314 by first and second end lengths 319a and 319b, respectively, toward the first and second ends 311 and 312 of the magnet core, and turn-around lengths 318a and 318b toward each of the first and second ends 311 and 312 of the magnet core 300, respectively. The overall length 316 is the length from the first end 311 to the second end 312 of the magnet core 300. The magnetic length 313 and winding length 314 are centered at the midpoint of the magnet core 300 and, respectively, are characterized by the portion of the magnet core 300 over which a maximum amplitude magnetic field is generated by a superconducting wire, and the portion of the magnet core over which the magnetic field is generated. The first and second turn around lengths 318*a* and 318*b* contain cylindrical protrusions 342 that protrude from the outer surface 322 (discussed in further detail in reference to FIG. 4A). The first and second turn-around lengths 318*a* and 318*b* are characterized by lengths of the magnet core with, respectively, increasing and decreasing magnetic field amplitudes. The first and second end lengths 319*a* and 319*b* are the lengths of the magnet core 300 extending from the first and second ends 311 and 312, respectively, of the magnet core 300 to the edges of the winding length 314 of the magnet core 300 toward the corresponding first and second ends 311 and 312. The first and second end lengths 319*a* and 319*b* are characterized by lengths along the magnet core 300 that may have a residual magnetic field generated by a superconducting wire, but are lengths with no electrical current flowing in a superconducting wire wrapping therefore generating no significant magnetic fields in the first and second end lengths 319*a* and 319*b*. Additionally, each of the defined lengths is parallel to a common longitudinal axis 310 of the magnet core 300.

A first helical flight 330 protrudes from the outer surface 322 of the magnet core 300 starting at the boundary between the end of the first end length 319 and the end of the winding length 314 toward the first end 311 of the magnet core 300. The first helical flight 330 forms a helix on the outer surface 322 of the magnet core 300 along the length of the magnet core 300. The first helical flight terminates at the boundary between the end of the second turn-around length 318*b* and the end of the magnetic length 313 towards the second end 312 of the magnet core 300. A second helical flight 332 protrudes from the outer surface 322 of the magnet core 300 starting at the boundary between the end of the second end length 319*b* and the end of the winding length 314 towards the second end 312 of the magnet core 300. The second helical flight 332 forms a helix that is interleaved with the first helical flight 330 on the outer surface 322 of the magnet core 300. The second helical flight 332 terminates at the boundary between the first end length 318*a* and the end of the magnetic length 313 toward the first end 311 of the magnet core 300. The first and second helical flights 330 and 332 have a same helical period 334, pole width 336, and helical height 338 relative to the outer surface 322 of the magnet core 300. The helical height 338 further defines the distance from the outer surface 322 of the magnet core 300 to a first and second helical surface 339*a* and 339*b* of the first and second helical flights 330 and 332, respectively. The first and second helical surfaces having a same radius of curvature 337 relative to the common longitudinal axis 310. The first and second helical flights 330 and 332 are interleaved to form a double helix on the outer surface 322 extending along the entire magnetic length 313 of the magnet core 310. Additionally, the first and second helical flights 330 and 332 form first and second helical grooves 340*a* and 340*b* between them, each groove having the same groove width 341 and a groove depth defined by, and equal to, the helical height 338.

The lengths of the magnet core 300 may be described in reference to the physical features of the magnet core 300. As shown in FIGS. 3A and 3B, the overall length 316 is the longitudinal length of the magnet core 300 from the first end 311 to the second end 312 of the magnet core 300. The magnetic length 313 is the length of the magnet core 300 along which both the first and second helical flights 330 and 332 exist and are interleaved to form a double helix on the outer surface 322 of the magnet core 300. The winding length 314 is the length of the magnet core 300 from the start of the first helical flight 330 toward the first end 311, to the termination of the second helical flight 332 toward the second end 312. Therefore, the winding length 314 is the length along the magnet core 300 along which at least one of either of the first or second helical flights 330 and 332 protrudes from the outer surface 322 of the magnet core 300. The first turn-around length 318*a* is the length along the magnet core 300 from the start of the first helical flight 330 toward the first end 311 of the magnet core, to the termination of the second helical flight 332 toward the first end 311 of the magnet core. Similarly, the second turn-around length 381*b* is the length along the magnet core 300 from the start of the second helical flight 332 toward the second end 312 of the magnet core 300, to the termination of the first helical flight 330 toward the second end 312 of the magnet core 300. Therefore, the first and second turn-around lengths 318*a* and 318*b* are the lengths of the magnet core 300 with only one of the first or second helical flights 330 and 332 protruding from the outer surface 322 of the magnet core. The first and second turn-around lengths 318*a* and 318*b* are also the lengths of the magnet core 300 which contain the plurality of cylindrical protrusions 342, or turn-around pins (discussed further in reference to FIG. 4A). The first end length 319*a* is the length of the magnet core 300 beginning at the edge of the first helical flight 330 near the first end 311 of the magnet core 300, and ending at the first end 311 of the magnet core 300. Similarly, the second end length 319*b* is the length of the magnet core 300 beginning at the edge of the second helical flight 332 near the second end 312 of the magnet core 300, and ending at the second end 312 of the magnet core 300. The first and second turn-around lengths 319*a* and 319*b* being regions with no helical flights, protrusions, or other external physical features extending from the outer surface 322 of the magnet core 300.

To generate magnetic fields inside of the bore hole 204 through the magnet core 300, a superconducting wire (not shown in FIGS. 3A-3C, but further discussed in reference to FIG. 4A-4C) is wrapped around the magnetic core 300 inside of, and guided by, the first and second helical grooves 340*a* and 340*b* created by the two helical flights 330 and 332. The superconducting wire may wrap the magnet core 300 in the first helical groove 340*a* starting at the beginning of the first helical flight 330 near the first end 311 of the magnet core 300. The first helical groove 340*a* may guide the winding of the superconducting wire along the length of the magnet core 300 creating a helical coil winding around the magnet core 300. At the termination of the first helical flight 330, the superconducting wire may wrap around the end of the first helical flight 330, or wrap around one of the plurality of cylindrical protrusions 342 in the second turn-around length 318*b* near the second end 312 of the magnet core 300. By wrapping around the end of the first helical flight 330 or one of the plurality of cylindrical protrusions 342, the superconducting wire may be guided from the first helical groove 340*a* to the adjacent, second helical groove 340*b*, reversing the direction of the superconductor wire wrapping along the length of the magnet core 300. Due to the functional nature of the cylindrical protrusions 342 to change the direction of the superconductor wire wrapping, the cylindrical protrusions 342 may also be considered turn-around pins existing in the turn-around lengths 318*a* and 318*b*. The second helical groove 340*b* may guide the superconducting wire from the second turn-around length 318*b* near the second end 312 of the magnet core 300, back towards the first end 311 of the magnet core 310. The superconducting wire may be wrapped around the end of the second helical flight 332, or one of the plurality of cylindrical protrusions 342 in the turn-around length 318 near the first end 311 of the magnet core 300. The process described in this paragraph may be repeated any number of times, wrapping the superconducting wire around the magnet core 300 and along the length of the magnet core 300 alternating between the first and second helical grooves 340a and 340b with each traversal.

The cylindrical protrusions 342 in FIGS. 3A-3C may assist in reversing the direction of a superconducting wire (not pictured in FIGS. 3A-3C) wrapping the magnet core 300, and guiding the superconducting wire into an adjacent helical groove as previously described. The inclusion of cylindrical protrusions 342 along the turn-around length 350 allows for the number of superconducting wire wrappings in a given helical groove to be tapered down from a maximum amount of wire wrappings in the magnetic length 313, to a minimum amount of wire wrappings at the ends of the winding length 314. Therefore, the magnetic field strength can be gradually reduced from full field strength in the bore hole 204 along the magnetic length 313, to a minimal or no magnetic field strength at the first and second ends 311 and 312 of the magnet core 300. Tapering of the magnetic field is important for controlling the trajectory of the charged particle or electron near the first and second ends 311 and 312 of the magnet core 300, preventing any changes to the electron beam trajectory and preserving the emitted radiation's beam quality. Therefore, a tapering of the magnetic fields near the first and second ends 311 and 312 of the magnet core 300 is required to produce high-energy, concentrated single-mode beams.

Figure 4A:
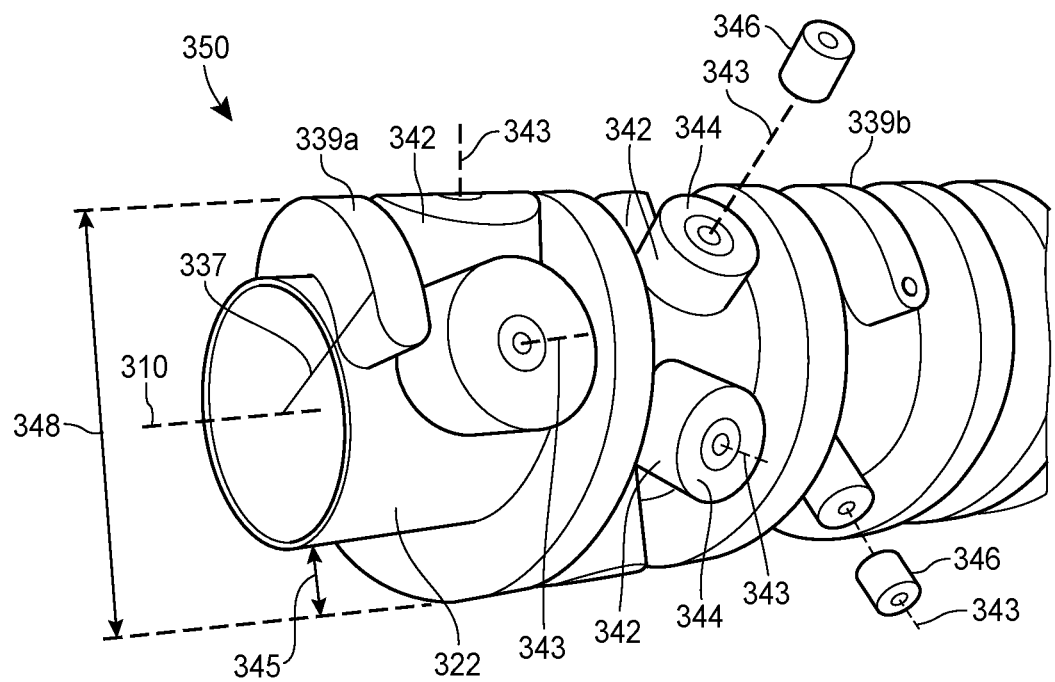
FIG. 4A is an enlarged exploded perspective view of an end of a turn-around length of a helical magnet core showing cylindrical protrusions having varied diameters and corresponding cylindrical extensions.

FIG. 4A is an enlarged exploded perspective view of an embodiment of an end of a turn-around length 350 of a magnet core 300 including a plurality of cylindrical protrusions 342. Each cylindrical protrusion 342 has a longitudinal axis 343 that is orthogonal to the common longitudinal axis 310 of the magnet core 300 and a height 345 relative to the outer surface 322 of the magnet core 300 and equal to the helical height 338. The longitudinal axis 343 of each protrusion 342 in the first turn-around length 318a is centered between consecutive turns of the first helical flight 330. The longitudinal axis of each protrusion 342 in the second turn-around length 318b is centered between consecutive turns of the second helical flight 332. Each cylindrical protrusion 342 has a top surface 344 at a height equal to that of the helical height 338 and with a radius of curvature equal to the radius of curvature 337 of the first and second helical flights 330 and 332.

FIG. 4A illustrates that the plurality of cylindrical protrusions 342 in the first and second turn-around lengths 318a and 318b may have varied diameters. The diameters of the cylindrical protrusions 342 may be determined by the required number of wire wrappings around a given cylindrical protrusion 342, the desired magnetic field along the magnetic length 313, the desired tapering of the magnetic field near the first and second ends 311 and 312, the width of the groove between the helical flights, or any other physical, electrical, or magnetic field requirements. For example, the diameter of a cylindrical protrusion 342 determines where in the helical groove the superconducting wire will be guided. The spacing between the cylindrical protrusions 342 affects the tapering of the magnetic field near the first and second ends 311 and 312. Larger diameter cylindrical protrusions 342 may accommodate more superconducting wire wrappings than a smaller diameter cylindrical protrusion 342 or turn-around pin. In other embodiments, multiple smaller diameter cylindrical protrusions 342 may be implemented to create a more gradual tapering up, or tapering down, of a magnetic field than by using a single or a lower number of larger diameter cylindrical protrusions 342. Also, the diameter of the cylindrical protrusions 342 is limited by the distance between consecutive helical windings of the first or second helical flights 340a and 340b in the first and second turn-around lengths 318a and 318b. Each cylindrical protrusion 342 has a top surface 344 with a radius of curvature equal to the radius of curvature of the first and second helical flights, and at a height equal to the helical height 338, to allow for a uniform total diameter 348 of the magnet core 300. The uniform magnet core total diameter 348 allows for a simpler mechanical design of an epoxy mold, and allows for tighter machining tolerances of the epoxy mold. Tighter tolerances of the epoxy mold allow for the mold to house the magnet core 300 after epoxy impregnation, providing the magnet with structural support for required straightness (less than 50 μm rms). In addition, the uniform diameter 348 of the magnet core 300 and tighter tolerances of the epoxy mold, allow for the epoxy mold to provide better thermal control and cooling capabilities than other undulator devices.

In embodiments, as illustrated in FIG. 4A, the cylindrical protrusions 342 may have corresponding detachable cylindrical extensions 346. The detachable cylindrical extensions 346 may attach to the cylindrical protrusions 342 at the top surfaces 344 of the cylindrical protrusions 342 to assist in the wrapping of the superconducting wire around the helical magnet core 300, and in particular around the cylindrical protrusions 342. The cylindrical extensions 346 may be detached from the cylindrical protrusions 342 after the superconducting wire has been wrapped around the magnet core 310, to achieve the desired uniform diameter of the magnet core 300 during epoxy impregnation, and further, during device operation. Each of the detachable cylindrical extensions 346 may have the same diameter as its corresponding cylindrical protrusions 342. In other embodiments, each of the cylindrical extensions 346 may have a tapered diameter that is wider than the corresponding cylindrical protrusion 342 away from the top surface 344 of the corresponding cylindrical protrusion 342, and a diameter that is the same diameter as the cylindrical protrusion 342 at the top surface 344 of the cylindrical protrusion 342. The cylindrical extensions 346 may be attached to the cylindrical protrusions 342 by means of a conventional screw, removable epoxy or glue, threads on the extensions 346 and protrusions 342 themselves, or by any other means. While it is favorable for the cylindrical protrusions 342 to be metallic for desired electromagnetic and thermal properties, the cylindrical extensions 346 may be metallic, plastic, glass, or any other material due to the fact that the cylindrical extensions 346 are removed before the magnet core 300 is operated. In embodiments, each of the first and second helical flights 330 and 332 may also have corresponding detachable cylindrical extensions 346 that attached to the helical surface 339 of each helical flight, the cylindrical extension 346 to assist in the wrapping of the superconducting wire around the end of the first or second helical flights 330 and 332, the cylindrical extensions 346 on the first and second helical flights 330 and 332 may be embodiments of cylindrical extensions 346 with any of the variations described above.

Figure 4C:
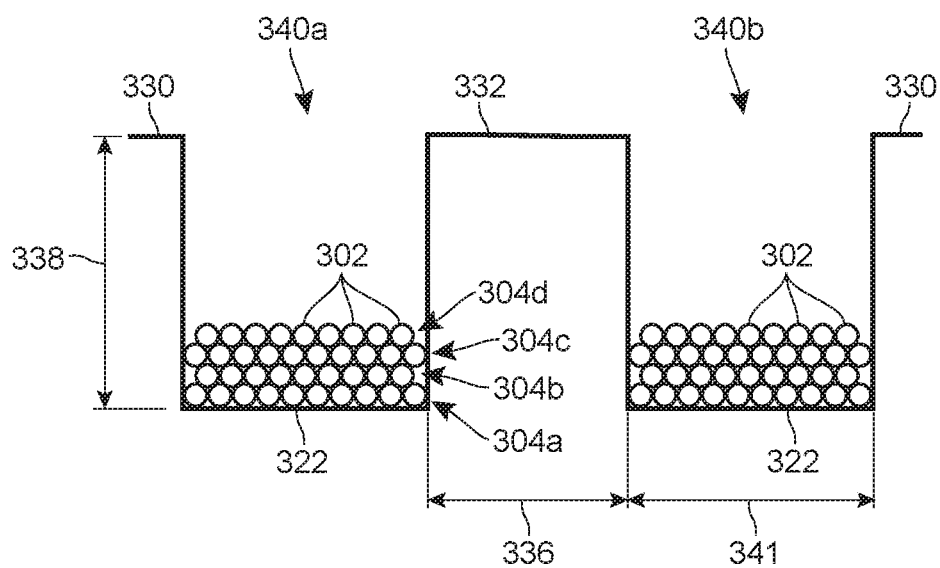
FIG. 4C is an enlarged cross sectional view of a superconducting wire wrapping a magnet core inside of helical grooves.
Figure 4B:
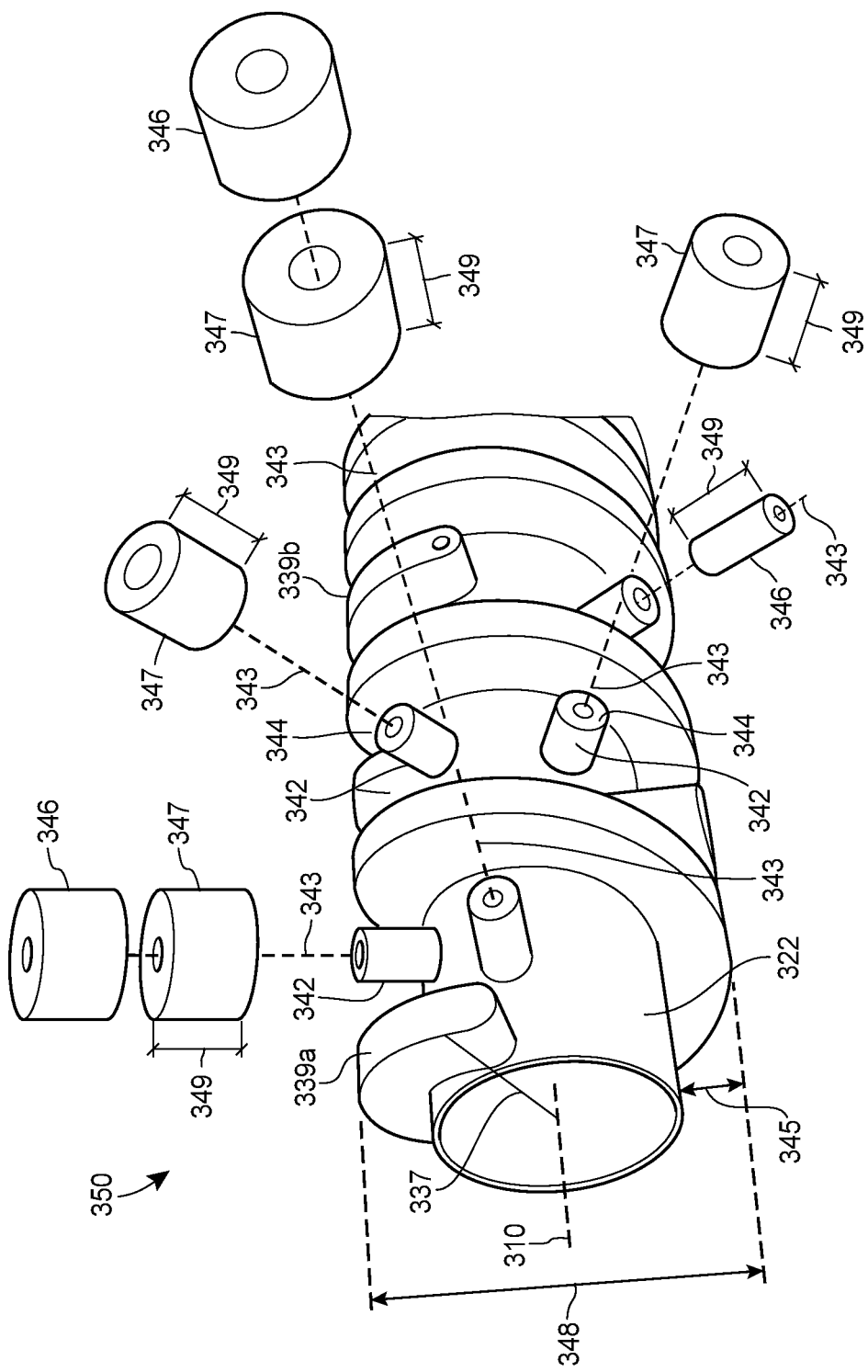
FIG. 4B is an enlarged exploded perspective view of an end of a turn-around length of a helical magnet core showing cylindrical protrusions having a same diameter, cylindrical sleeves, and corresponding cylindrical extensions.

FIG. 4B illustrates that the plurality of cylindrical protrusions 342 in the first and second turn-around lengths 318a and 318b may have the same external diameter. In embodiments with same diameter cylindrical protrusions 342, cylindrical sleeves 347 may be placed around the cylindrical protrusions 342. The cylindrical sleeves 347 have a cylindrical center bore hole with an internal diameter equal to, or greater than, the diameter of the cylindrical protrusions 342 such that the cylindrical sleeve 347 may be placed around a corresponding cylindrical protrusion 342. As illustrated in FIG. 4B, the cylindrical sleeves 347 may have various external diameters. Additionally, the cylindrical sleeves 347 may have a top surface parallel to the top surface 344 of the cylindrical protrusions 342. In embodiments, the cylindrical sleeve 347 may have a cylindrical sleeve height 349 equal to the height of the first and second helical flights 339a and 339b, and the height of the top surface 344 of the cylindrical protrusions 342 may be equal to or less than the cylindrical sleeve height 349.

The cylindrical sleeves 347 may be affixed to the outer surface 322 or to the cylindrical protrusions 342 by soldering, welding, fusing, removable epoxy or glue, a conventional screw, threads on the cylindrical sleeves 347 and protrusions 342 themselves, or by any other means. In embodiments, the cylindrical sleeves 347 may be held in place by a superconducting wire wrapped around the outer surface 322 and the cylindrical sleeves 347. In embodiments that employ cylindrical sleeves 347, cylindrical extensions 346 may be attached to the cylindrical protrusions 342 or the cylindrical sleeves 347 by means of a conventional screw, removable epoxy or glue, threads on the extensions 346 and protrusions 342 or sleeves 347 themselves, or by any other means.

FIG. 4C is an enlarged cross sectional view taken at A-A in FIG. 3B of a superconductor wire 302 wrapping the magnet core 300 inside of the first and second helical grooves 340a and 340b. The superconductor wire 302, shown in cross section as small circles in FIG. 4C, wraps the magnet core 300 inside of the first and second helical grooves 340a and 340b multiple times creating superconducting wire layers 304a-d in the first and second helical grooves 340a and 340b, the first superconducting wire layer 304a being in contact with the outer surface 322 inside of the first and second helical grooves 340a and 340b. In embodiments, the number of superconducting wire wrappings in the first superconducting wire layer 304a determines the number of cylindrical protrusions 342 required in the second turn-around length 318b, and the number of superconducting wire wrappings in the second wire layer 304b determines the number of cylindrical protrusions 342 required in the first turn-around length 318a. In embodiments, such as the embodiment illustrated in FIG. 4C, the first superconducting wire layer 304a may have an even number of wire wrappings (e.g., ten wire wrappings) on the outer surface 322 of the magnet core 300. Additionally, the second superconducting wire layer 304b may have an odd number of superconducting wire wrappings (e.g., nine wire wrappings) nestled between the crevices created by the first superconducting wire layer 340a wrappings. The third superconducting wire layer 304c may have an even number of wire wrappings, and the fourth superconducting wire layer 304d may have an odd number of wire wrappings with each layer of wire wrappings nestled in the crevices formed by the previous layer of wire wrappings. In other embodiments, the odd number superconducting wire layers 304a and 304c may have an odd number of superconducting wire wrappings, and the even number superconducting wire layers 304b and 304d may have an even number of superconducting wire wrappings. Although the embodiment of FIG. 4C only shows four superconducting wire layers 304a-d, other embodiments may employ any number of layers of superconducting wire layers, with any number of wire wrappings per layer achievable by the geometries of the superconducting wire, and the helical grooves 340a and 340b.

When a current is passed through the superconducting wire 302, magnetic fields are generated in the bore hole 204 along the length of the magnet core 300. Due to the back and forth windings of the superconducting wire 302 along the length of the magnet core 310, the current flowing in the superconducting wire 302 in the first helical groove 340a is in a direction opposite to the current flowing in the superconducting wire 302 in the second helical groove 340b. Therefore, the helical wire wrappings in adjacent helical grooves generate magnetic fields in opposite directions or orientations, resulting in a periodic magnetic field in the bore hole 204, similar to that of FIG. 1. The helical groove design allows for a single superconducting wire 302 to be used to generate alternating magnetic fields along the magnet core 300, rather than the more common approaches of a series of independent superconductor magnets along the length of the magnet core 300 which complicates electrical connections (e.g., requiring resistive joints and/or multiple circuits) and cooling requirements, or a series of permanent magnets along the length of the magnet core 300, having its own unique drawbacks mentioned previously.

Figure 5:
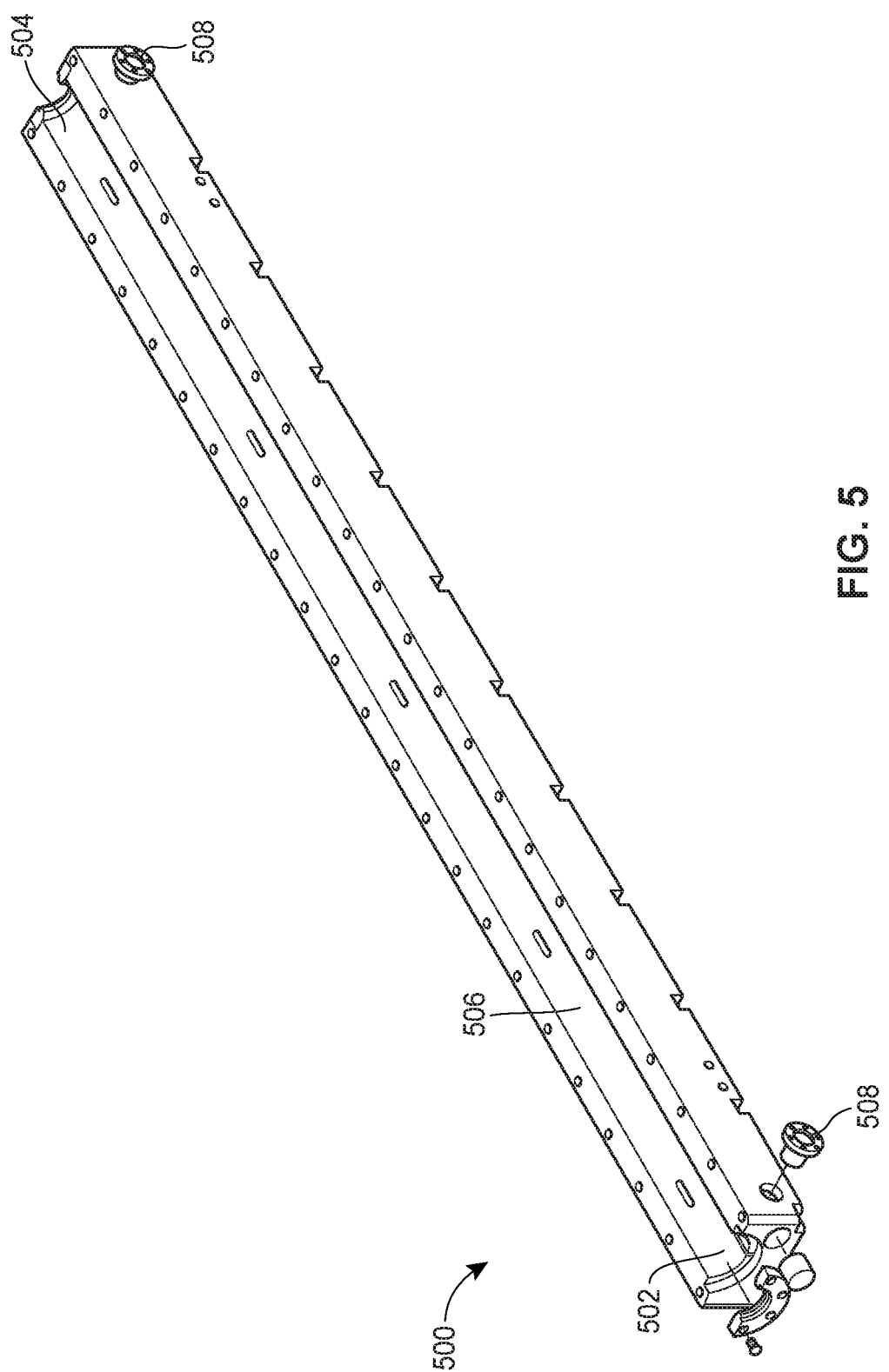
FIG. 5 is an illustration of a strong-back panel for use in a strong-back enclosure for encasing a helical magnet core.

FIG. 5 illustrates an embodiment of a strong-back enclosure panel 500 that may be implemented as the first and/or second strong-back panels 206a and 206b of the strong-back enclosure 206 illustrated in FIG. 1. The panel 500 has a first end 502 and a second end 504. A concave opening 506 sized to receive the magnet core 300, and having a curvature with a radius equal to the helical flight radius of, runs from the first end 502 to the second end 504 along the length of the panel 500. Referring simultaneously to FIGS. 2, 3B, 3C, and 5, the concave opening 506 having a radius and a curvature determined by the dimensions of the magnet core 300, is configured to contain the magnet core 300 with the superconducting wire wrapped around the magnet core 300. The compact superconducting wire turn-around scheme using cylindrical protrusions, described herein, allows for the uniform total diameter 348 of the undulator magnet core 300. The uniform magnet core diameter simplifies the design and construction of the strong-back enclosure panels 500 and allows for tighter machining tolerances of the mold which benefits the structural integrity and straightness of the magnet core 300, as well as the cooling of the magnet core 300 and superconducting wire 302. Two panels 500 may be placed on opposite sides of the magnet core 300 configured such that the magnet core 300 is contained in the concave opening 506 of each of the two panels 500 resulting in a strong-back enclosure similar to the strong-back enclosure 206 of FIG. 1. Referring now simultaneously to FIG. 1 and FIG. 5, the strong-back enclosure 206 surrounding the magnet core 300 may act as an epoxy mold during epoxy impregnation, which secures the superconducting wire windings to the magnet core 300 and provides a means for thermally conductive cooling of the undulator magnet core 300. After the epoxy impregnation, the magnet core 300 remains within the two panels 206a and 206b, whereas typically, any epoxy mold or structure surrounding a superconducting magnet core is removed before installation and operation of an undulator device. The two panels 206a and 206b further act to provide mechanical support for the magnet core 300. Together, the two panels 206a and 206b form the strong-back enclosure 206 that ensures that the magnet core 300 maintains a very high degree of straightness, several microns of rms value, for electron beam trajectory, and to preserve the quality of the generated radiation. Further, the strong-back enclosure 206 provides a means of indirect cooling of the magnet core 300 and superconducting wire coils. Each of the panels 206a and 206b, has coolant ports 508 that are connected by the coolant channel 208 along the length of the panel 500. A fluid coolant may be injected into a coolant port 508, flow through the coolant channel 208, and exit the opposing coolant port 508 therefore acting as a heat sink for any excess heat in the undulator 200 through thermal conduction to the fluid coolant.

The helical magnetic field value depends mainly on the undulator helical period 334, the superconducting wire coil current density, and the conductor winding radius, which depends on the diameter of the outer surface 322. The helical magnetic field may be increased by increasing the undulator period 334, increasing the superconducting wire coil current density, or by decreasing the diameter of the outer surface 322. Referring now back to FIGS. 3A-C, in an embodiment of a magnet core 300 the magnet core 300 is made of iron. The inner surface 320 has a diameter of 29 mm, the outer surface 322, or winding surface, has a diameter of 31 mm, the helical period 334 is 31.5 mm, and the overall length 316 of the magnet core 300 is 1.4 m. It is desirable to have small winding diameters because tighter windings of the superconducting wire provide a broader range of tunable energies of the generated photons or radiation. An electric current may be supplied to the superconducting wire in the embodiment of the undulator presently described to produce a maximum on-axis peak magnetic field of 0.41 T at 450 A, which is greater than the capabilities of pure permanent magnet undulators, normal conducting electromagnets, and non-helical magnets of similar dimensions.

In embodiments, the inner surface 320 may have diameters of 1 to 5 mm, 5 to 10 mm, 10 to 20 mm, 20 to 50 mm, 10 to 50 mm, 50 to 100 mm, 100 to 250 mm, or 250 to 500 mm. Similarly in embodiments, the outer surface 322 may have a diameter of 2 to 5 mm, 5 to 10 mm, 10 to 20 mm, 20 to 50 mm, 10 to 50 mm, 50 to 100 mm, 100 to 250 mm, or 250 to 501 mm. Additionally, in embodiments, the helical period 334 may be 10 to 20 mm, 20 to 40 mm, 40 to 60 mm, 10 to 50 mm, 50 to 100 mm, 100 to 500 mm, or any helical period 334 to achieve a desired periodic magnetic field in a helical superconducting undulator device.

In embodiments the superconducting wire 302 may be niobium titanium, niobium-tin, triniobium-tin, magnesium diboride, a yttrium barium copper oxide, a bismuth strontium calcium copper oxide, vanadium-gallium, or any other superconductor material. In embodiments, the magnet core 300 may be soft iron, laminated silicon steel, laminated iron, a silicon alloy, iron, silicon steel, silicon iron, a mu-metal, a permalloy, a supermalloy, mollypermalloy, a high-flux nickel iron alloy, a ferrite material, a ferromagnetic material, a ferromagnetic material, or any other material that may provide support for the winding of the superconducting wire coils, and a magnetic permeability able to confine and guide magnetic fields. The choice of a magnet core material may depend on the magnetic permeability of the material, core losses of the material, the coercivity and/or hysteresis of the material, mechanical strength, and thermal properties of the material, among other factors.

The temperature control of superconducting undulator devices is imperative to preserve the quality of the generated magnetic field, to prevent coil deformation or quenching, and to prevent any damage to the superconducting undulator device. It is therefore important to manage the heat load generated during operation of a superconducting undulator. The total operational heat load of a superconducting undulator can be characterized by a static heat load, and a dynamic heat load. The static heat load includes heat generated by radiation, and heat conduction through supports and electrical current leads due to high electrical currents, i.e., typically greater than 500 A. The dynamic heat load includes heat generated by the electron beam passing through the superconducting undulator. The temperature of the magnetic coils must be maintained at a temperature around 4.2 K to prevent quenching of the superconducting magnetic coils, and therefore prevent the loss of superconductivity of the wire.

Figure 6A:
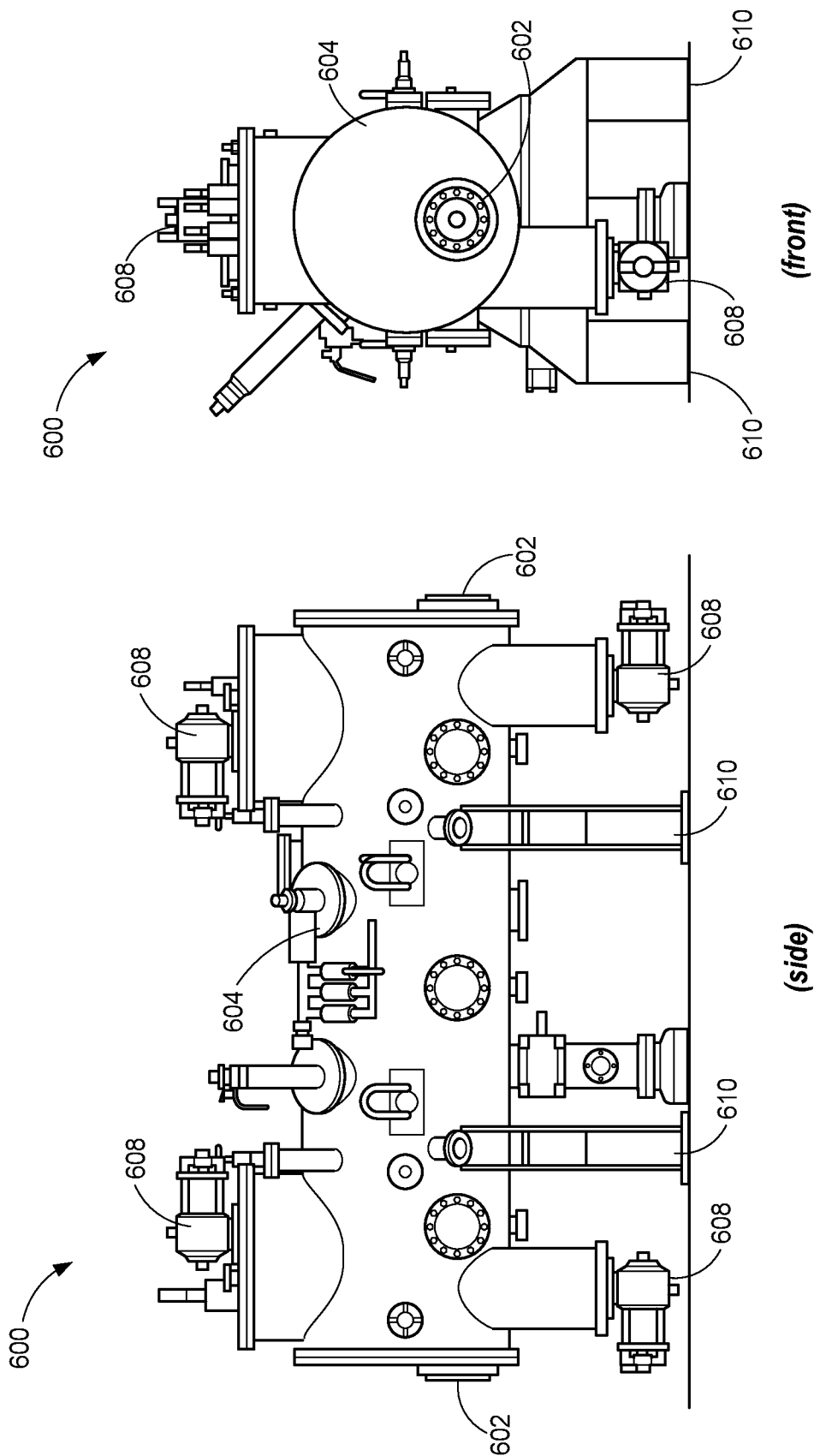
FIG. 6A illustrates an embodiment of a cryogenic cooling system for controlling the temperature of a superconducting undulator.
Figure 6B:
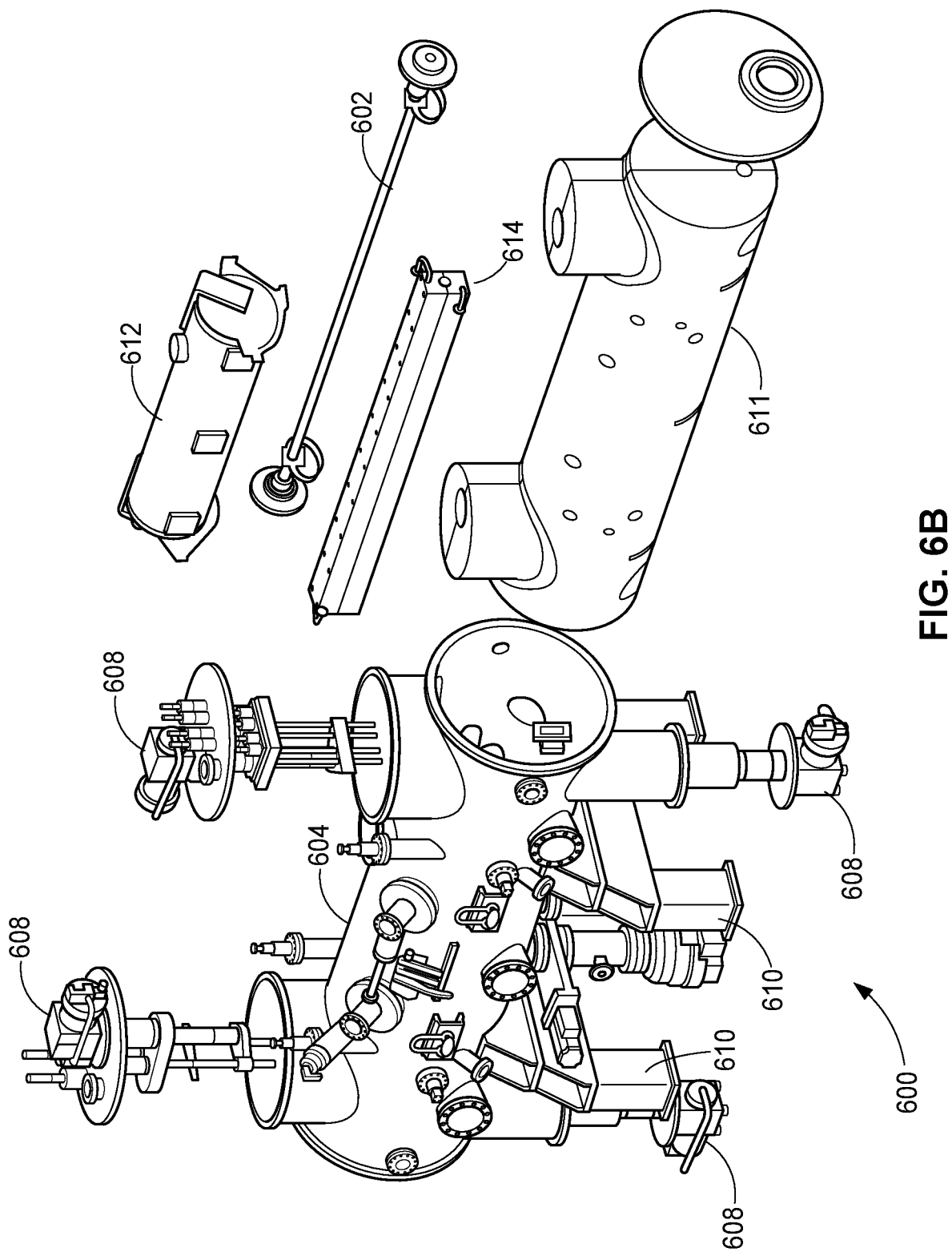
FIG. 6B is an exploded view of a cryogenic cooling system for controlling the temperature of a superconducting undulator.

FIG. 6A illustrates an embodiment of a cryogenic cooling system 600 for controlling the temperature of a superconducting undulator 602. The cryogenic cooling system 600 may have a cryostat vacuum vessel 604 that houses the superconducting undulator 602 along with other components of the cryogenic cooling system 600, described further below with reference to FIG. 6B. The cryogenic cooling system 600 may also have cryocoolers 608 affixed to panels on the cryostat vacuum vessel 604, and mechanical mounts 610 attached to the cryogenic vacuum vessel 604 to provide a mounting support structure for the cryogenic vacuum vessel 604. FIG. 6B is an exploded view of the cryogenic cooling system 600 illustrated in FIG. 6A. In addition to the superconducting undulator 602, the cryogenic vacuum vessel 604 may also contain a thermal shield 611, and a liquid helium vessel 612. In embodiments, the superconducting undulator 602 may be held in a strong-back enclosure 614. The liquid helium vessel 612 may be mounted on or affixed to the strong-back enclosure 614 via multiple thermal intercepts to cool the superconducting undulator 602 through thermal conduction to the strong-back enclosure 614. In embodiments, it may be desirable to reduce the thermal impedance between the cryocoolers 608 and the liquid helium vessel 612 to increase the cooling capacity of the cryogenic cooling system 600. Therefore, high thermal-conductance busbars, made of copper or other thermally conductive materials, may be used to provide a thermally conductive connection between the cryocoolers 608 and the liquid helium vessel 612. In addition, the thermal shield 611 may be conduction cooled by the cryocoolers 608, a liquid nitrogen trace tube, and/or another conductive or inductive cooling method.

As similarly described in FIG. 2, the strong-back enclosure 614 of FIG. 6B may also have cooling channels along the length of the strong-back enclosure 614 which may be connected to the liquid helium vessel 612, and further filled with liquid helium. The superconducting undulator 602 may be cooled via heat conduction to the liquid helium in the cooling channels, and, more specifically, heat may be extracted from the superconducting undulator 601 by re-condensation of helium vapor in the liquid helium vessel 612. In other embodiments, liquid helium may flow through the cooling channels in the strong-back enclosure 614 by removing the cryocoolers 608 and using a current lead/bayonet connection turret. In embodiments that employ flowing liquid helium in the cryogenic cooling system 600, a cryoplant may supply liquid helium to an inlet bayonet to replenish liquid helium boil-off. The liquid helium boil-off gas may then return to the cryoplant or a helium vent line via an exhaust bayonet.

Figure 7:
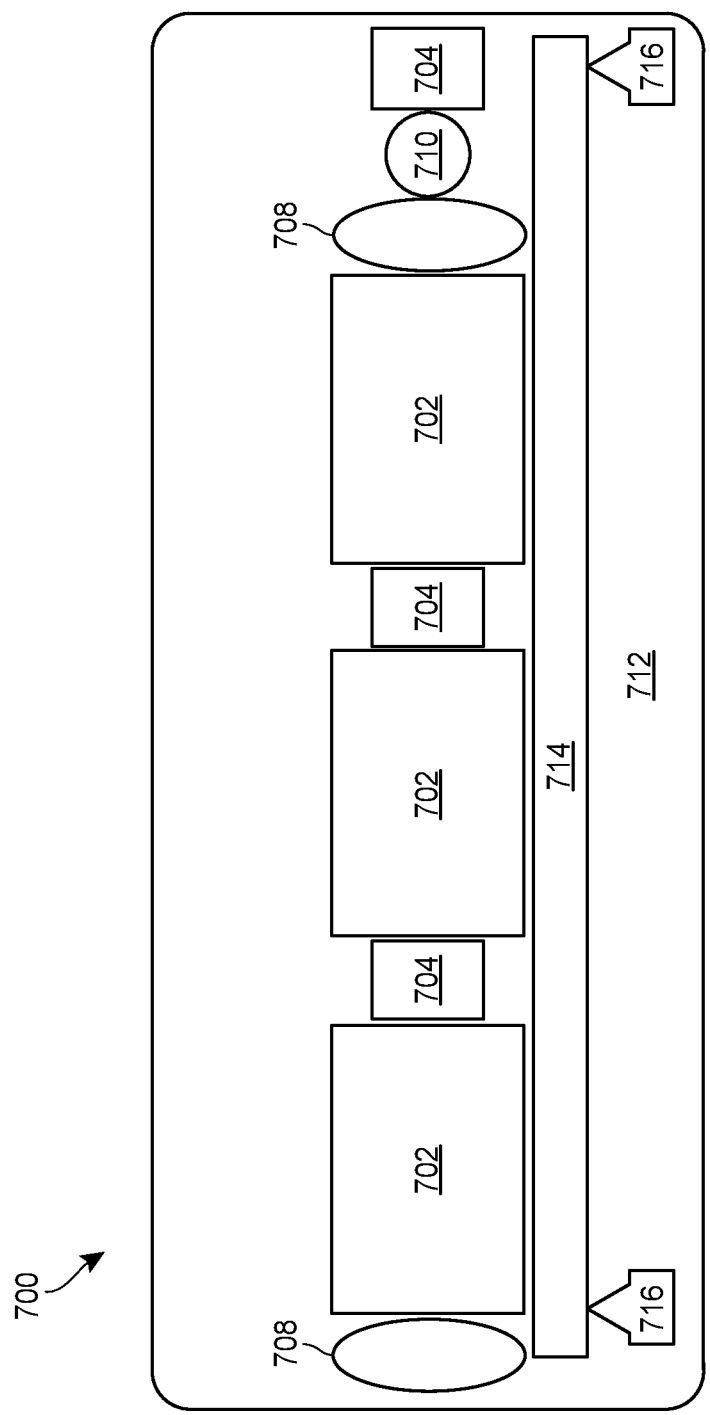
FIG. 7 is a block diagram of a free-electron laser system with multiple undulator segments and components.

As described in embodiments herein, a superconductor undulator device may be housed in a strong-back enclosure to provide structural support and enable cooling of the undulator device. In addition, the strong-back enclosure may be used to assist in alignment of the superconducting undulator with other components in a system for use in a synchrotron or other type of particle accelerator. For example, FIG. 7 is a block diagram of a free-electron laser system 700 with three superconducting undulator segments 702, three cold phase-shifters 704, two cold beam-focusing quadrupoles 708, and a beam position monitor 710, all of which may be housed in a cryogenic cooling system 712. The added components of phase-shifters 704 and quadrupoles 708 are essential for systems with multiple superconducting undulator segments 702 to preserve the required phasing between the electron beam and radiation, and for geometries from one undulator segment 702 to the next undulator segment 702, or similarly, from one free-electron laser system 700 to another, cascaded, free-electron system 700.

The individual components of the free-electron laser system 700 of FIG. 7 may be aligned independently relative to a common universal strong-back 714. The various components of the free-electron laser system 700 may be physically mounted on the universal strong-back 714 and alignment of the independent components of the free-electron laser system 700 may be performed in a non-operational warm state, at room temperature conditions while the cryogenic cooling system 712 is not active. The components' geometries and material properties are well known, therefore the expected shrinkage of components due to cooling may be calculated and compensated for before the cryogenic cooling system 712 is activated. In an operational state, the cryogenic cooling system 712 may be active and the components housed in the cryogenic cooling system 712 may be cooled to operational temperatures (i.e., around 4 K). The positions of the components housed in the cryogenic cooling system 712 may be optically measured, for example, through optically transparent windows embedded in the cryogenic cooling system 712 using laser displacement sensors. The measured and predicted positions of the various components housed in the cryogenic cooling system 712 may then be compared, and corrections to component positions may be made in-situ by using special alignment rods. The cryogenic cooling system 712 may be activated multiple times to measure the positions of the components contained within the cryogenic cooling system 712 and to verify the reproducibility of components' positions.

Multi-undulator free-electron laser systems, such as the free-electron laser system 700 illustrated in FIG. 7, may require a beam-position alignment procedure during operation to maintain the high level of spatial alignment required to initiate and maintain the lasing process. The beam-position alignment procedure may use readings from a beam position monitor 710 to center the undulator segments 702 and quadrupoles 708 on the electron beam trajectory. Typically, the focusing quadrupoles 708 are only used for electron focusing, but the focusing quadrupoles 708 may also be used to assist in component alignment in reference to the electron beam trajectory. The magnetic centers of the quadrupoles 708 may be determined by varying the electron beam energy by a factor of three to four times, and using the beam position monitor 710 to measure the induced beam kicks, or induced beam divergence, generated by off electron-beam axis quadrupoles 708. Position alignment corrections may then be applied to the quadrupoles 708 by adjusting the position of the universal strong-back 714, and therefore the quadrupoles 708 may be centered on the electron beam trajectory. Since the undulator segments' 702 centerlines are pre-aligned within 50 microns rms with magnetic centers of quadrupoles 708, and follow alignment motions along quadrupoles, both the quadrupoles and superconducting undulator segments 702 will be aligned by the beam-position alignment procedure described herein.

In embodiments, alignment quadrupoles may be included in addition to focusing quadrupoles 708. Each superconducting undulator segment 702 may have a dedicated alignment quadrupole that is centered on the magnetic center of the alignment quadrupole's corresponding superconducting undulator segment 702. The beam-position alignment procedure previously described may be performed for each alignment quadrupole allowing for the spatial alignment of the superconducting undulator segments 702. The alignment quadrupoles may be active while performing the beam-position alignment procedure, and the alignment quadrupoles may inactive or off during operation of the free-electron laser system 700 of FIG. 7.

The free-electron laser system 700 may include a position controller 716 at each end of the universal strong-back 714. The position controllers may provide control of various spatial degrees of freedom of the universal strong-back 714, including control of the position of the universal strong-back 714 in the three spatial dimensions, the pitch of the universal strong-back 714, and the yaw of the universal strong-back 714. In embodiments, the superconducting undulator segments 702 may be aligned within 50 µm rms of either focusing quadrupoles 708 or alignment quadrupoles, allowing for the superconducting undulator segments 702 to be centered on the electron beam trajectory through the use of the position controllers 716 and the implementation of the beam-positioning alignment procedure described previously herein. While the embodiment of the free-electron laser system 700 of FIG. 7 has three superconducting undulator segments 702, other embodiments may have one, two, five, ten, or any other number of superconducting undulators. Embodiments may also have any other number of phase shifters, quadrupoles, and/or beam position monitors. Embodiments may also omit any of the components illustrated in FIG. 7, or may include other components not illustrated in FIG. 7. Additionally, multiple embodiments of free-electron laser systems 700 may be cascaded to generate radiation of any range of frequencies and any number of spatial modes as desired.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A superconducting undulator device comprising: a cylindrical magnet core, the core having (i) a magnetic length, (ii) a winding length extending beyond the magnetic length, (iii) an overall length extending beyond the winding length at each end by an end length, (iv) a first turn-around length defined as the portion of the winding length toward the first end extending beyond the magnetic length, and (v) a second turn-around length defined as the portion of the winding length toward the second end extending beyond the magnetic length, the midpoints of each of the magnetic length, the winding length, and the overall length being co-located, the core further comprising (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core, each helical flight having a same pole width, a same height and a top helical surface with a radius of curvature relative to the longitudinal axis of the magnet core, a total diameter equal to twice the radius of curvature of the top helical surfaces, the two helical flights cooperating to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core; a plurality of cylindrical protrusions in each turn-around length, each cylindrical protrusion having a longitudinal axis orthogonal to the longitudinal axis of the core, and having a height, relative to the outer surface of the core, equal to the height of the helical flights, the protrusions further comprising a top surface at the height of the helical flights with a radius of curvature equal to the radius of curvature of the top surface of the helical flights, the longitudinal axis of each of the cylindrical protrusions in the turn-around length toward the first end centered between consecutive turns of the first helical flight and the longitudinal axis of each of the cylindrical protrusions in the turn-around length toward the second end centered between consecutive turns of the second helical flight; a superconducting wire wrapping the core and disposed within the helical groove, the wire forming a multilayer coil configured to receive and carry a current and to cooperate with the core to generate magnetic fields for guiding the charged particle beam; and a plurality of detachable cylindrical extensions, each having a longitudinal axis orthogonal to the longitudinal axis of the core and coaxial with the longitudinal axis of the corresponding cylindrical protrusion, the detachable cylindrical extensions coupled to the top surfaces of the cylindrical protrusions.

2. A superconducting undulator device according to aspect 1, further comprising a strong-back enclosure that houses the cylindrical magnetic core, cylindrical protrusions, and superconducting wire, the strong-back enclosure comprising two panels each with a concave opening having a diameter equal to the total diameter of the magnet core, epoxy injection ports extending from an outer surface of the panel and in fluid communication with the concave opening, a coolant channel extending longitudinally along the length of the strong-back enclosure not in fluid communication with the concave opening, and a coolant port providing fluid communication between an exterior surface of the strong-back panel and the coolant channel.

3. A superconducting undulator device according to either aspect 1 or aspect 2, wherein the longitudinal axis of each of the cylindrical protrusions in the first turn-around length toward the first end centered between consecutive turns of the first helical flight is positioned a quarter of a helical period from the longitudinal axis of any other cylindrical protrusion in the first turn-around length toward the first end of the magnet core, and the longitudinal axis of each of the cylindrical protrusions in the second turn-around length toward the second end centered between consecutive turns of the second helical flight is positioned a quarter of a helical period from the longitudinal axis of any other cylindrical protrusion in the second turn-around length toward the second end of the magnet core.

4. A superconducting undulator device according to any one of aspects 1 to 3, wherein the superconducting wire wrapping the core and disposed within the helical groove forming the multilayer coil, with layers numbered beginning with the layer closest to the outer surface of the magnet core, has an even number of coil windings on odd numbered coil layers, and an odd number of coil windings on even numbered coil layers.

5. A superconducting undulator device comprising: a cylindrical magnet core, the core having (i) a magnetic length, (ii) a winding length extending beyond the magnetic length, (iii) an overall length extending beyond the winding length at each end by an end length, and (iv) a turn-around length defined as the portion of the winding length at each end extending beyond the magnetic length, the midpoints of each of the magnetic length, the winding length, and the overall length being co-located, the core further comprising (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core, each helical flight having a same pole width, a same height and a top helical surface with a radius of curvature relative to the longitudinal axis of the magnet core, a total diameter equal to twice the radius of curvature of the top helical surfaces, the two helical flights cooperating to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core; a plurality of cylindrical protrusions in each turn-around length, each cylindrical protrusion having a longitudinal axis orthogonal to the longitudinal axis of the core, and having a height, relative to the outer surface of the core, equal to the height of the helical flights, the protrusions further comprising a top surface at the height of the helical flights and with a radius of curvature equal to the radius of curvature of the top surface of the helical flights, the longitudinal axis of each of the cylindrical protrusions in the first turn-around length toward the first end is centered between consecutive turns of the first helical flight and is positioned a quarter of a helical period apart from the any other cylindrical protrusion in the first turn-around length toward the first end of the magnet core, and the longitudinal axis of each of the cylindrical protrusions in the second turn-around length toward the second end is centered between consecutive turns of the second helical flight and is positioned a quarter of a helical period from the longitudinal axis of any other cylindrical protrusion in the second turn-around length toward the second end of the magnet core; and a superconducting wire wrapping the core and disposed within the helical groove, the wire forming a multilayer coil configured to receive and carry a current and to cooperate with the core to generate magnetic fields for guiding the charged particle beam.

6. A superconducting undulator device according to aspect 5, further comprising a strong-back enclosure that houses the cylindrical magnetic core, cylindrical protrusions, and superconducting wire, the enclosure the strong-back enclosure comprising two panels each with a concave opening having a diameter equal to the total diameter of the magnet core, epoxy injection ports extending from an outer surface of the panel and in fluid communication with the concave opening, a coolant channel extending longitudinally along the length of the strong-back enclosure not in fluid communication with the concave opening, and a coolant port providing fluid communication between an exterior surface of the strong-back panel and the coolant channel.

7. A superconducting undulator device according to either aspect 5 or aspect 6, further comprising a plurality of detachable cylindrical extensions, each having a longitudinal axis orthogonal to the longitudinal axis of the core and coaxial with the longitudinal axis of the corresponding cylindrical protrusion, the detachable cylindrical extensions selectively coupled to the top surfaces of the cylindrical protrusions.

8. A superconducting undulator device according to any one of aspects 5 to 7, wherein the superconducting wire wrapping the core and disposed within the helical groove forming the multilayer coil, with layers numbered beginning with the layer closest to the outer surface of the magnet core, has an even number of coil windings on odd numbered coil layers, and an odd number of coil windings on even numbered coil layer.

9. A superconducting undulator device comprising: a cylindrical magnet core, the core having (i) a magnetic length, (ii) a winding length extending beyond the magnetic length, (iii) an overall length extending beyond the winding length at each end by an end length, and (iv) a turn-around length defined as the portion of the winding length at each end extending beyond the magnetic length, the midpoints of each of the magnetic length, the winding length, and the overall length being co-located, the core further comprising (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core, each helical flight having a same pole width, a same height and a top helical surface with a radius of curvature relative to the longitudinal axis of the magnet core, a total diameter equal to twice the radius of curvature of the top helical surfaces, the two helical flights cooperating to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core; a plurality of cylindrical protrusions in each turn-around length, each cylindrical protrusion having a longitudinal axis orthogonal to the longitudinal axis of the core, and having a height, relative to the outer surface of the core, equal to the height of the helical flights, the protrusions further comprising a top surface at the height of the helical flights and with a radius of curvature equal to the radius of curvature of the top surfaces of the helical flights, the longitudinal axis of each of the cylindrical protrusions in the turn-around length toward the first end centered between consecutive turns of the first helical flight and the longitudinal axis of each of the cylindrical protrusions in the turn-around length toward the second end centered between consecutive turns of the second helical flight; and a superconducting wire wrapping the core and disposed within the helical groove, the wire forming a multilayer coil, with layers numbered beginning with the layer closest to the outer surface of the magnet core, having 12 coil windings on even numbered coil layers and 11 coil windings on odd numbered coil layers, the coil configured to receive and carry a current and to cooperate with the core to generate magnetic fields for guiding the charged particle beam.

10. A superconducting undulator device according to aspect 9, further comprising a strong-back enclosure that houses the cylindrical magnetic core, cylindrical protrusions, and superconducting wire, the enclosure the strong-back enclosure comprising two panels each with a concave opening having a diameter equal to the total diameter of the magnet core, epoxy injection ports extending from an outer surface of the panel and in fluid communication with the concave opening, a coolant channel extending longitudinally along the length of the strong-back enclosure not in fluid communication with the concave opening, and a coolant port providing fluid communication between an exterior surface of the strong-back panel and the coolant channel.

11. A superconducting undulator device according to either aspect 9 or aspect 10, further comprising a plurality of detachable cylindrical extensions, each having a longitudinal axis orthogonal to the longitudinal axis of the core and coaxial with the longitudinal axis of the corresponding cylindrical protrusion, the detachable cylindrical extensions selectively coupled to the top surfaces of the cylindrical protrusions.

12. A superconducting undulator device of any of aspects 9 to 11, wherein the longitudinal axis of each of the cylindrical protrusions in the first turn-around length toward the first end centered between consecutive turns of the first helical flight is positioned a quarter of a helical period from the longitudinal axis of any other cylindrical protrusion in the first turn-around length toward the first end of the magnet core, and the longitudinal axis of each of the cylindrical protrusions in the second turn-around length toward the second end is centered between consecutive turns of the second helical flight positioned a quarter of a helical period from the longitudinal axis of any other cylindrical protrusion in the second turn-around length toward the second end of the magnet core.

The invention claimed is:

1. A superconducting undulator device comprising:
a cylindrical magnet core, the core having (i) a magnetic length, (ii) a winding length extending beyond the magnetic length, (iii) an overall length extending beyond the winding length at each end by an end length, (iv) a first turn-around length defined as the portion of the winding length toward the first end extending beyond the magnetic length, and (v) a second turn-around length defined as the portion of the winding length toward the second end extending beyond the magnetic length, the midpoints of each of the magnetic length, the winding length, and the overall length being co-located, the core further comprising (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core, each helical flight having a same pole width, a same height and a top helical surface with a radius of curvature relative to the longitudinal axis of the magnet core, a total diameter equal to twice the radius of curvature of the top helical surfaces, the two helical flights cooperating to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core;

a plurality of cylindrical protrusions in each turn-around length, each cylindrical protrusion having a longitudinal axis orthogonal to the longitudinal axis of the core, and having a height, relative to the outer surface of the core, equal to the height of the helical flights, the protrusions further comprising a top surface at the height of the helical flights with a radius of curvature equal to the radius of curvature of the top surface of the helical flights, the longitudinal axis of each of the cylindrical protrusions in the turn-around length toward the first end centered between consecutive turns of the first helical flight and the longitudinal axis of each of the cylindrical protrusions in the turn-around length toward the second end centered between consecutive turns of the second helical flight;

a superconducting wire wrapping the core and disposed within the helical groove, the wire forming a multilayer coil configured to receive and carry a current and to cooperate with the core to generate magnetic fields for guiding the charged particle beam; and a plurality of detachable cylindrical extensions, each having a longitudinal axis orthogonal to the longitudinal axis of the core and coaxial with the longitudinal axis of the corresponding cylindrical protrusion, the detachable cylindrical extensions coupled to the top surfaces of the cylindrical protrusions.

2. A superconducting undulator device according to claim 1, further comprising a strong-back enclosure that houses the cylindrical magnetic core, cylindrical protrusions, and superconducting wire, the strong-back enclosure comprising two panels each with a concave opening having a diameter equal to the total diameter of the magnet core, epoxy injection ports extending from an outer surface of the panel and in fluid communication with the concave opening, a coolant channel extending longitudinally along the length of the strong-back enclosure not in fluid communication with the concave opening, and a coolant port providing fluid communication between an exterior surface of the strong-back panel and the coolant channel.

3. A superconducting undulator device according to claim 1, wherein the longitudinal axis of each of the cylindrical protrusions in the first turn-around length toward the first end centered between consecutive turns of the first helical flight is positioned a quarter of a helical period from the longitudinal axis of any other cylindrical protrusion in the first turn-around length toward the first end of the magnet core, and the longitudinal axis of each of the cylindrical protrusions in the second turn-around length toward the second end centered between consecutive turns of the second helical flight is positioned a quarter of a helical period from the longitudinal axis of any other cylindrical protrusion in the second turn-around length toward the second end of the magnet core.

4. A superconducting undulator device according to claim 1, wherein the superconducting wire wrapping the core and disposed within the helical groove forming the multilayer coil, with layers numbered beginning with the layer closest to the outer surface of the magnet core, has an even number of coil windings on odd numbered coil layers, and an odd number of coil windings on even numbered coil layers.

5. A superconducting undulator device comprising:

a cylindrical magnet core, the core having (i) a magnetic length, (ii) a winding length extending beyond the magnetic length, (iii) an overall length extending beyond the winding length at each end by an end length, and (iv) a turn-around length defined as the portion of the winding length at each end extending beyond the magnetic length, the midpoints of each of the magnetic length, the winding length, and the overall length being co-located, the core further comprising (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core, each helical flight having a same pole width, a same height and a top helical surface with a radius of curvature relative to the longitudinal axis of the magnet core, a total diameter equal to twice the radius of curvature of the top helical surfaces, the two helical flights cooperating to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core;

a plurality of cylindrical protrusions in each turn-around length, each cylindrical protrusion having a longitudinal axis orthogonal to the longitudinal axis of the core, and having a height, relative to the outer surface of the core, equal to the height of the helical flights, the protrusions further comprising a top surface at the height of the helical flights and with a radius of curvature equal to the radius of curvature of the top surface of the helical flights, the longitudinal axis of each of the cylindrical protrusions in the first turn-around length toward the first end is centered between consecutive turns of the first helical flight and is positioned a quarter of a helical period apart from the any other cylindrical protrusion in the first turn-around length toward the first end of the magnet core, and the longitudinal axis of each of the cylindrical protrusions in the second turn-around length toward the second end is centered between consecutive turns of the second helical flight and is positioned a quarter of a helical period from the longitudinal axis of any other cylindrical protrusion in the second turn-around length toward the second end of the magnet core; and a superconducting wire wrapping the core and disposed within the helical groove, the wire forming a multilayer coil configured to receive and carry a current and to cooperate with the core to generate magnetic fields for guiding the charged particle beam.

6. A superconducting undulator device according to claim 5, further comprising a strong-back enclosure that houses the cylindrical magnetic core, cylindrical protrusions, and superconducting wire, the enclosure the strong-back enclosure comprising two panels each with a concave opening having a diameter equal to the total diameter of the magnet core, epoxy injection ports extending from an outer surface of the panel and in fluid communication with the concave opening, a coolant channel extending longitudinally along the length of the strong-back enclosure not in fluid communication with the concave opening, and a coolant port providing fluid communication between an exterior surface of the strong-back panel and the coolant channel.

7. A superconducting undulator device according to claim 5, further comprising a plurality of detachable cylindrical extensions, each having a longitudinal axis orthogonal to the longitudinal axis of the core and coaxial with the longitudinal axis of the corresponding cylindrical protrusion, the detachable cylindrical extensions selectively coupled to the top surfaces of the cylindrical protrusions.

8. A superconducting undulator device according to claim 5, wherein the superconducting wire wrapping the core and disposed within the helical groove forming the multilayer coil, with layers numbered beginning with the layer closest to the outer surface of the magnet core, has an even number of coil windings on odd numbered coil layers, and an odd number of coil windings on even numbered coil layer.

9. A superconducting undulator device comprising:
   a cylindrical magnet core, the core having (i) a magnetic length, (ii) a winding length extending beyond the magnetic length, (iii) an overall length extending beyond the winding length at each end by an end length, and (iv) a turn-around length defined as the portion of the winding length at each end extending beyond the magnetic length, the midpoints of each of the magnetic length, the winding length, and the overall length being co-located, the core further comprising (i) an inner surface defined by a bore hole formed coaxially with a longitudinal axis of the magnet core and extending over the overall length of the core from a first end to a second end, the inner surface defining a space through which a charged particle beam may pass, and (ii) an outer surface having formed thereon first and second helical flights interleaved to form a double helix along the magnetic length of the core, each helical flight having a same pole width, a same height and a top helical surface with a radius of curvature relative to the longitudinal axis of the magnet core, a total diameter equal to twice the radius of curvature of the top helical surfaces, the two helical flights cooperating to form helical grooves between them, the grooves having a groove width, wherein the first helical flight begins at a first end of the winding length toward the first end of the core, and terminates at a second end of the magnetic length toward the second end of the core, and wherein the second helical flight begins at a second end of the winding length toward the second end of the core, and terminates at a first end of the magnetic length toward the first end of the core;
   a plurality of cylindrical protrusions in each turn-around length, each cylindrical protrusion having a longitudinal axis orthogonal to the longitudinal axis of the core, and having a height, relative to the outer surface of the core, equal to the height of the helical flights, the protrusions further comprising a top surface at the height of the helical flights and with a radius of curvature equal to the radius of curvature of the top surfaces of the helical flights, the longitudinal axis of each of the cylindrical protrusions in the turn-around length toward the first end centered between consecutive turns of the first helical flight and the longitudinal axis of each of the cylindrical protrusions in the turn-around length toward the second end centered between consecutive turns of the second helical flight; and
   a superconducting wire wrapping the core and disposed within the helical groove, the wire forming a multilayer coil, with layers numbered beginning with the layer closest to the outer surface of the magnet core, having 12 coil windings on even numbered coil layers and 11 coil windings on odd numbered coil layers, the coil configured to receive and carry a current and to cooperate with the core to generate magnetic fields for guiding the charged particle beam.

10. A superconducting undulator device according to claim 9, further comprising a strong-back enclosure that houses the cylindrical magnetic core, cylindrical protrusions, and superconducting wire, the enclosure the strong-back enclosure comprising two panels each with a concave opening having a diameter equal to the total diameter of the magnet core, epoxy injection ports extending from an outer surface of the panel and in fluid communication with the concave opening, a coolant channel extending longitudinally along the length of the strong-back enclosure not in fluid communication with the concave opening, and a coolant port providing fluid communication between an exterior surface of the strong-back panel and the coolant channel.

11. A superconducting undulator device according to claim 9, further comprising a plurality of detachable cylindrical extensions, each having a longitudinal axis orthogonal to the longitudinal axis of the core and coaxial with the longitudinal axis of the corresponding cylindrical protrusion, the detachable cylindrical extensions selectively coupled to the top surfaces of the cylindrical protrusions.

12. A superconducting undulator device of claim 9, wherein the longitudinal axis of each of the cylindrical protrusions in the first turn-around length toward the first end centered between consecutive turns of the first helical flight is positioned a quarter of a helical period from the longitudinal axis of any other cylindrical protrusion in the first turn-around length toward the first end of the magnet core, and the longitudinal axis of each of the cylindrical protrusions in the second turn-around length toward the second end is centered between consecutive turns of the second helical flight positioned a quarter of a helical period from the longitudinal axis of any other cylindrical protrusion in the second turn-around length toward the second end of the magnet core.

* * * * *